Sept. 1, 1931. C. F. BOSTOCK 1,821,137
HOLDER FOR MIRRORS
Filed April 11, 1930
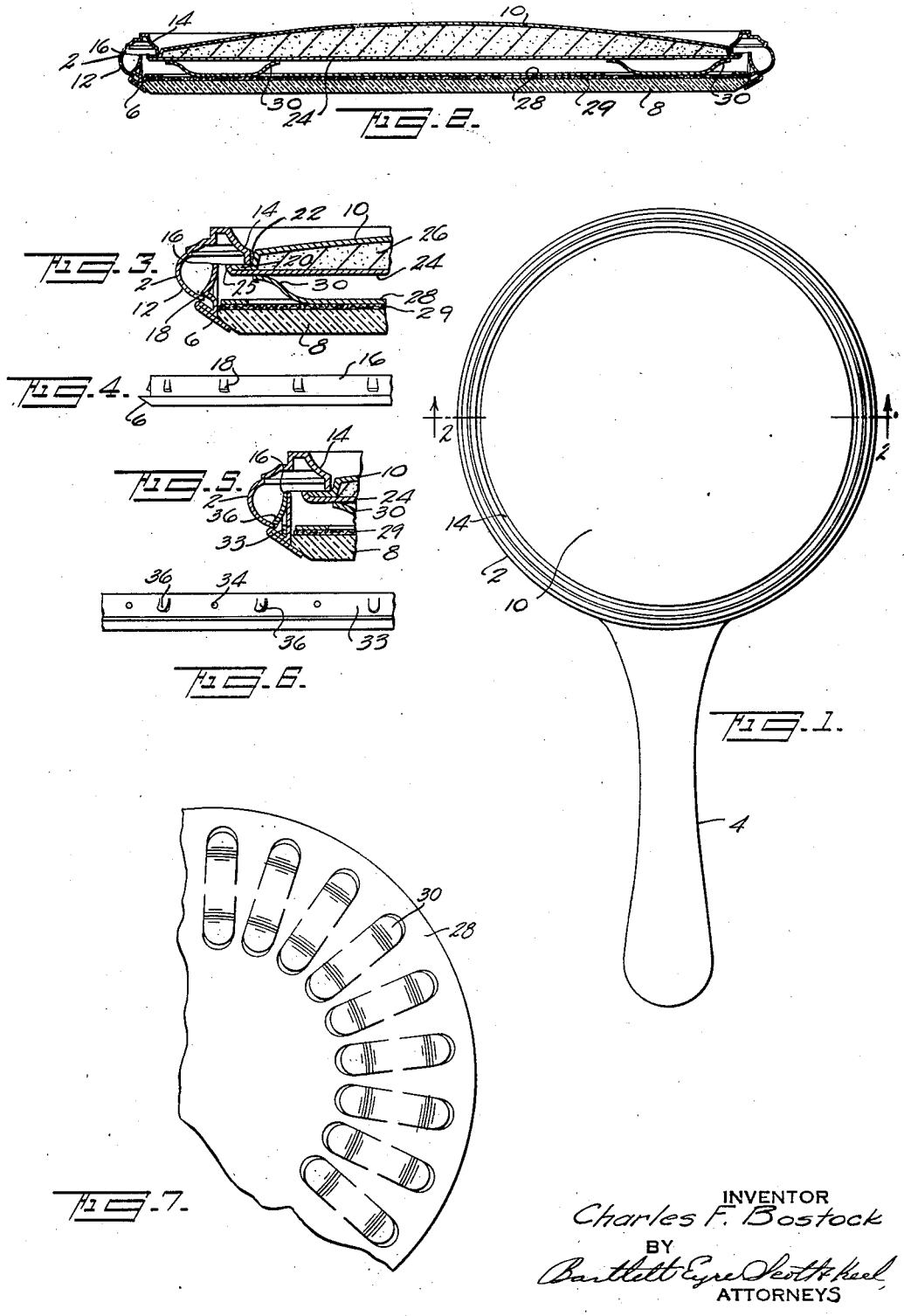
INVENTOR
Charles F. Bostock
BY
ATTORNEYS Patented Sept. 1, 1931

1,821,137

UNITED STATES PATENT OFFICE

CHARLES FREDERICK BOSTOCK, OF LITTLE SILVER, NEW JERSEY, ASSIGNOR TO INTERNATIONAL SILVER COMPANY, OF MERIDEN, CONNECTICUT, A CORPORATION OF NEW JERSEY

HOLDER FOR MIRRORS

Application filed April 11, 1930. Serial No. 443,315.

My invention relates to metal frames or holders for mirrors and similar articles.

The principal object of my invention is to provide a frame or holder of this character which together with the mirror or other article may be easily assembled, and in which the back and frame of the holder are made separate so that the back may be separately decorated as by engine turning or engraving and the frame separately annealed.

Another object of my invention is to provide a frame or holder of the character indicated which is of simple and cheap construction and may be conveniently manufactured.

The several features of the invention, whereby these and other objects may be attained, will be readily understood from the following description and accompanying drawings, in which:

Figure 1 is a rear view of a mirror and its holder embodying the features of the invention in their preferred form;

Fig. 2 is a sectional view taken on the line 2—2 of Fig. 1;

Fig. 3 is a detail sectional view on an enlarged scale corresponding to a portion of Fig. 2;

Fig. 4 is a side elevation of a portion of a bezel constituting a component part of the holder;

Fig. 5 is a view corresponding to Fig. 3 but showing a modified form of bezel;

Fig. 6 is a side elevation of a portion of the form of bezel shown in Fig. 5;

Fig. 7 is a detail plan view of a portion of a spring pad forming a part of the holder.

The device illustrated in the drawings is provided with an annular frame 2 having a handle 4, a bezel 6 for a mirror 8, and a back 10. The annular frame 2 is provided with an inwardly directed forward edge 12 and a forwardly directed rear edge 14.

The bezel 6 has a portion bent upon itself to provide an inwardly beveled portion which engages the bevel of the mirror, and an outwardly beveled portion that engages the outer side of the edge 12 of the frame, and is further provided with a cylindrical portion or ring 16 having outwardly struck projections 18 providing shoulders which engage the inner side of the edge 12 of the frame.

The back 10 may be convexedly curved as shown and its outer margin is stepped to provide a flange 20 which engages the rear edge 14 of the frame, and a portion 22 substantially perpendicular to the flange 20 which is arranged adjacent the inner side of the edge 14. The inner side of the back 10 is enclosed by a cover 24 having a rearwardly projecting marginal lip 25 engaging the outer edge of the back, the space between the back 10 and the cover 24 being preferably filled with a suitable reinforcing cement 26. A member 28 of spring sheet metal is interposed between the cover 24 and a cardboard disk 29 on the back of the mirror 8. This member 28 has radially extending struck-up portions 30 which engage the cover 24 of the back so as to provide a spring pad between said cover and the mirror.

To assemble my improved holder, the back 10 and cover 24 with the cement 26 between them, are passed through the front opening in the frame to position the flange 20 of the back against the forwardly directed rear edge 14 of the frame. The bezel, mirror and spring cushion 28 is then inserted into the front opening of the frame with the struck-up portions 30 positioned against the back cover 24. The projections 18 are forced past the forward edge 12 of the frame so as to interlock therewith and thus cooperate with the bevel portion of the bezel that engages the outside of the edge 12 of the frame to securely hold the bezel and the mirror in place. The mirror and the back of the frame are securely held by the spring pad 28 that is interposed between them.

With this construction the back 10 may be separately decorated with engine turning or engraving as desired, and thus is not affected by the annealing of the main portion of the frame as would be the case if the back and annular portion of the frame were made integral as has heretofore been customary. Also, as the frame and back may be made up separately considerable time and saving in manufacture may be effected. As the back is the part which receives the decoration, in case it is found that the particular decoration does not meet with success, the backs alone are lost, the frames being adapted to receive backs differently decorated. It will be apparent that my improved holder may be easily and conveniently assembled and when assembled the parts thereof are firmly and securely held.

In the form of bezel shown in Figs. 5 and 6, instead of the projections being struck out of the collar of the bezel as shown in Figs. 3 and 4, a separate steel collar 33 is secured to the collar of the bezel by means of rivets 34, and this steel collar is provided with outwardly struck clips 36 for engagement with the inner side of the forward edge of the frame.

While the device is particularly adapted for use in holding a mirror, it will be understood that it may be used in holding brushes and other articles adapted to be held by a bezel, and that the term "mirror" as used in the claims is illustrative and shall be interpreted to include such other articles.

As will be evident to those skilled in the art, my invention permits various modifications without departing from the spirit thereof or the scope of the appended claims.

What I claim is:

1. An article of the class described having, in combination, a frame having its front and back open with its rear portion provided with a forwardly directed shoulder, a mirror for the front of the frame, a bezel having projections adapted to be snapped back of the inner edge of the front part of said frame so as to cause the bezel to be held by said projections and a body portion thereof engaging the opposite side of said edge of the frame, a back for the frame, and a resilient cushion interposed between said back and the mirror for holding the back against said shoulder and the mirror against said bezel.

2. An article of the class described having, in combination, a frame having its front and back open, said front provided with an inwardly directed edge and said back provided with a forwardly directed shoulder, a mirror for the front of the frame, a bezel adapted to be pressed into interlocking engagement with the inner forward edge portion of the frame, a back for the frame having its outer edge portion arranged in engagement with said shoulder, and means for yieldingly pressing said back against said shoulder and said mirror against said bezel.

3. An article of the class described having, in combination, a frame having its front open, a mirror for the front of the frame, a bezel having a collar portion provided with outward projections adapted to be forced back of the inner edge of the front of the frame and having an outwardly and rearwardly inclined flange adapted to engage the front side of said edge of the frame so as to cause the bezel to interlock with said edge of the frame, and resilient means for pressing said mirror against said bezel.

4. An article of the class described having, in combination, a frame having its front and back open and having at the rear thereof a forwardly directed edge portion providing a shoulder, a back comprising a member having a stepped outer edge flange composed of two portions, one being substantially parallel to the said back and the other substantially perpendicular thereto, said back being adapted to be inserted into the frame from the front thereof so as to position the parallel portion of said flange in engagement with said shoulder with the portion of said flange arranged perpendicular thereto positioned adjacent the inner periphery of said forwardly directed back edge portion of the frame, a cover extending over the forward side of said back with its outer edge provided with an upset flange engaging the outer edge of said parallel portion of the back so as to hold the parts from relative lateral movement, a mirror for the front of the frame, a bezel for the mirror secured to the frame, and resilient means arranged between said cover and said mirror for holding the back against said shoulder.

In testimony whereof, I have signed my name to this specification.

CHARLES F. BOSTOCK.